United States Patent [19]
Henderson et al.

[11] Patent Number: 6,027,755
[45] Date of Patent: Feb. 22, 2000

[54] BLEACHING EARTH PRODUCT AND METHOD FOR PRODUCING AND USING THE SAME

[75] Inventors: John H. Henderson, Solon; Keith A. Delaney, Hudson, both of Ohio; Edward P. Molloy, Jackson, Miss.

[73] Assignee: Engelhard Corporation, Iselin, N.J.

[21] Appl. No.: 08/837,559

[22] Filed: Apr. 21, 1997

[51] Int. Cl.⁷ .................................................... A21D 1/27
[52] U.S. Cl. .......................................... 426/253; 554/191
[58] Field of Search .............................. 554/191; 426/253

[56] References Cited

U.S. PATENT DOCUMENTS

| | | | |
|---|---|---|---|
| 1,397,113 | 11/1921 | Prutzman . | |
| 1,579,326 | 4/1926 | Kuffman . | |
| 1,642,871 | 9/1927 | Chappell et al. . | |
| 2,470,872 | 5/1949 | Secor . | |
| 2,472,489 | 6/1949 | Pierce | 252/450 |
| 2,484,828 | 10/1949 | Hickey | 252/450 |
| 2,553,239 | 5/1951 | Christiansen | 252/450 |
| 2,563,977 | 8/1951 | Van Horn et al. | 252/450 |
| 2,574,895 | 11/1951 | Stecker | 252/450 |
| 2,650,202 | 8/1953 | Hawes | 252/449 |
| 2,671,058 | 3/1954 | Mickelson | 252/450 |
| 2,872,419 | 2/1959 | Farnand et al. | 252/450 |
| 2,892,800 | 6/1959 | Taipale | 252/450 |
| 2,981,697 | 4/1961 | Mickelson | 252/450 |
| 3,372,043 | 3/1968 | Fanselow | 106/72 |
| 3,617,215 | 11/1971 | Sugahara et al. | 23/182 |
| 4,178,341 | 12/1979 | Caswell | 264/117 |
| 4,507,396 | 3/1985 | Hickson | 502/8 |
| 4,956,126 | 9/1990 | Staal et al. | 260/428 |
| 5,008,226 | 4/1991 | Taylor et al. | 502/81 |
| 5,151,211 | 9/1992 | Brooks et al. | 252/186.1 |
| 5,401,862 | 3/1995 | Gonus et al. | 554/191 |

FOREIGN PATENT DOCUMENTS

| | | |
|---|---|---|
| 0 276 954 | 8/1988 | European Pat. Off. . |
| 2 019 604 | 7/1970 | France . |
| 863 791 | 1/1953 | Germany . |
| 521214 | 5/1940 | United Kingdom . |
| 874432 | 1/1957 | United Kingdom . |
| 815924 | 7/1957 | United Kingdom . |

OTHER PUBLICATIONS

Hawley, The Condensed Chemical Dictionary, 10 th ed., page 777, 1981.

"Bleaching Clay" by A.D. Rich, Industrial Minerals and Rocks, 3rd Edition, The American Institute of Mining, Metallurgical and Petroeum Engineers 1960, pp. 93–101.

"Acid–activated Clays" by D.R. Taylor and D.B. Jenkins, Society of Mining Engineers of AIME, Transactions vol. 282, pp. 1901–1910.

"Bleaching Earths –Preparation, Properties and Practical Application" by R. Fahn, Süd–Chemie A.G., Munich, 1976, pp. 1–17.

"Innovations in Catalysis Create Environmentally Friendly THF Process" by J. Haggin, C&EN Chicago, Apr. 3, 1995.

"Special Clays" by G. M. Clarke, Industrial Minerals, Sep. 1985, pp. 25–33.

"Use of Bleaching, Clays, In Processing Edible Oils" by L. Richardson, Journal of the American Oil Chemists' Society, vol. 55, pp. 777–780.

"Palygorskite and Sepiolite", The Chemical Constitution of Clays pp. 107–114.

"Applied Clay Mineralogy" by R. L. Grim, pp. 320–326 (1962).

*Primary Examiner*—Thomas Dunn

[57] ABSTRACT

Disclosed are compositions, suitable for use in the purification of edible or inedible oils, of agglomerated particles of at least one minus ten micron bleaching clay, wherein said agglomerated particles are microspheres having an average diameter of at least about 10 microns as well as a process for preparing microspheres suitable for use as bleaching earths having improved filtration characteristics by agglomerating a mixture consisting of i) at least one minus ten micron bleaching clay, ii) at least one liquid medium, and iii) at least one binder material, wherein said mixture is agglomerated under conditions which produce microspheres having an average diameter of greater than about 10 microns. Also disclosed is a process for purification of edible and inedible oils which comprises mixing one or more oils with the compositions described above and then physically removing said composition from the oil.

34 Claims, 2 Drawing Sheets

6,027,755

BLEACHING EARTH PRODUCT AND METHOD FOR PRODUCING AND USING THE SAME

FIELD OF THE INVENTION

This invention relates to compositions suitable for use as bleaching earths in the purification of edible or inedible oils and the processes for preparing said compositions and to processes for purification of edible and inedible oils using said compositions.

DESCRIPTION OF RELATED ART

Clays of high sorptive capacity and catalytic activity have been used for decades to adsorb colored pigments (e.g., carotenoids, chlorophyll) and colorless impurities (e.g., soaps, phospholipids) from edible and inedible oils. This process is called "bleaching" and serves both cosmetic and chemical stability purposes. Thus, bleaching is used to reduce color of vegetable oils, for example, whereby very clear, almost water-white oils are produced that meet with consumer expectations. Bleaching also stabilizes the oil by removing colored and colorless impurities which tend to "destabilize" the oil, resulting in oils that rancidity or revert to a colored state more easily if these impurities are not removed.

The bleaching process is typically carried out by contacting the feed oil in a slurry with the bleaching earth at an elevated temperature and, after bleaching is complete, separating the bleaching earth from the oil. Typically, this separation is carried out by filtration. Two commercially significant properties of the bleaching earth are bleaching activity and filtration rate. A bleaching clay with the highest possible bleaching efficiency (smallest dosage or weight of bleaching earth needed to produce a certain effect on a given weight of oil) is desirable because, when smaller amounts of clay are needed to produce the desired oil properties, clay inventories and costs to the refiner are minimized. In addition, less spent filter cake is generated, minimizing both the loss of entrained bleached oil and spent cake disposal costs.

Filtration rate, however, is also very important, as slow filtration will lower throughput rates at a given pressure drop or require significant capital investment to deal with higher pressure drops across the filter(s). Usually, the filtration rate is inversely related to the bleaching earth efficiency as smaller particle sizes typically result in higher activity but lower filtration rates. Oil refiners, in choosing a bleaching earth, are typically forced to compromise between getting the most activity per pound of bleaching earth versus speedy filtration.

Activated bleaching earths have traditionally been produced by processing selected clays, either with or without acid activation, so that the particle size distribution of the finished bleaching earth is such that the spent bleaching earth can be separated by filtration after effecting the desired purification of the oil. For example, the particle size distribution of these bleaching earths is typically such that at least 90% by weight of the particles are between 5 and 90 microns. The relative filterability is significantly affected by the percentage of "fines" or particles below about 10 microns. Particles in traditional bleaching earth products are derived from some larger piece of raw clay. This is seen in mercury penetration data, in which most of the pore volume appears as micropores in the 1400 Å pore diameter region.

There is a desire, therefore, for bleaching earths having improved filtration rates while maintaining maximum bleaching efficiency, or, alternatively, having improved bleaching efficiency (same bleaching with less bleaching earth) while maintaining adequate filterability for the processor's system and economics.

SUMMARY OF THE INVENTION

In one embodiment, this invention relates to a composition suitable for use in the purification of edible or inedible oils comprised of agglomerated particles of at least one minus ten micron bleaching clay, wherein said agglomerated particles are microspheres having an average diameter of at least about 10 microns.

In another embodiment, this invention relates to a composition comprised of microspheres of at least one bleaching clay, wherein said microspheres have an average diameter of at least about 10 microns and a pore volume of at least about 0.3 cubic centimeters per gram in the 600 Å to 10,000 Å pore diameter range.

In one other embodiment, this invention relates to a process for preparing microspheres suitable for use as bleaching earths having improved filtration characteristics which comprises agglomerating a mixture consisting of i) at least one minus ten micron bleaching clay, ii) at least one liquid medium, and iii) at least one binder material, wherein said mixture is agglomerated under conditions which produce microspheres having an average diameter of greater than about 10 microns.

In still another embodiment, this invention relates to a process for purification of edible and inedible oils which comprises mixing one or more oils with the compositions described above and then physically removing said composition from the oil.

DESCRIPTION OF PREFERRED EMBODIMENTS

Figure 1:
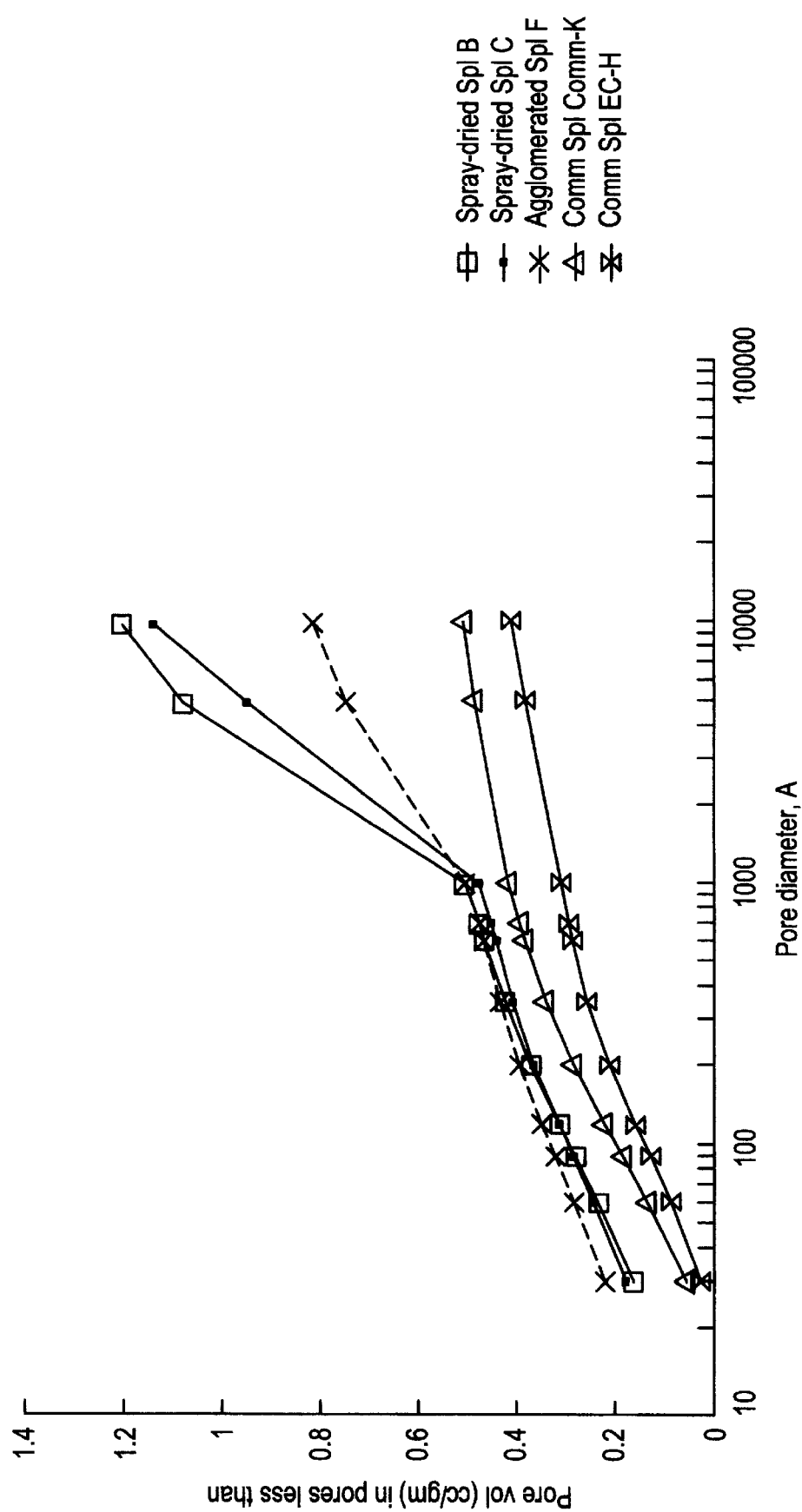
FIG. 1 is a plot of the cumulative pore volume curve vs. the logarithm of the corresponding pore diameter inside the particle.
Figure 2A:
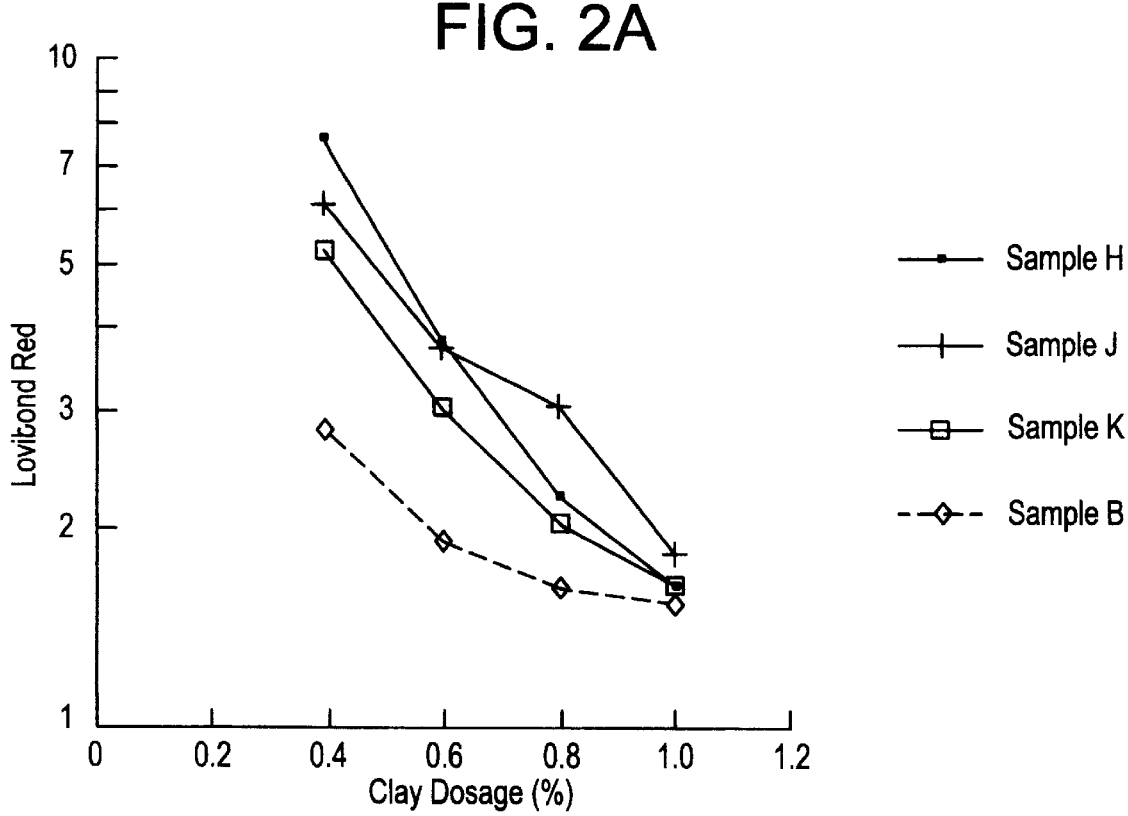
FIGS. 2a and 2b are graphs of color measurements from a McCloskey Edible Oil Colorimeter for oil products of bleaching operations done at various bleaching clay dosages.
Figure 2B:
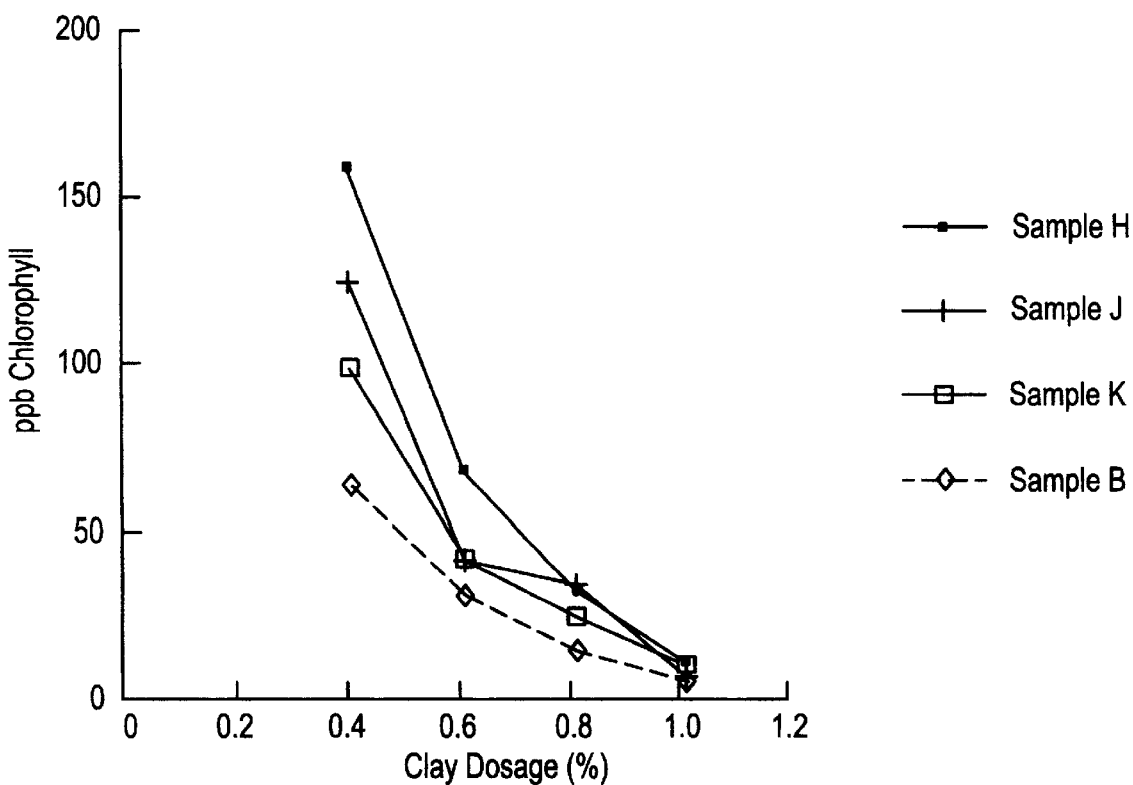

As previously stated, this invention provides compositions suitable for use in the purification of edible or inedible oils comprised of agglomerated particles of at least one minus 10 micron bleaching clay, wherein said agglomerated particles are microspheres having an average diameter of at least 10 microns. The term "microsphere" as used herein refers to agglomerates of the invention being round in general and need not necessarily be strictly "spherical" in shape.

Bleaching clays suitable for use in accordance with this invention may be "natural" bleaching clays or "activated" bleaching clays. Natural bleaching clays exhibit adsorptive properties without having been subjected to chemical treatment. Heat treatment and milling, for example, may be used to produce activated clay from specially-selected natural raw clay sources. Activated bleaching clays are typically processed through a chemical treatment such as contact with a mineral or organic acid. This latter category can include soaking and then washing out the acid and leachable salts or impregnating the clay with the acid, without washing.

The term "bleaching clay" as used within the context of this invention is well known to those of ordinary skill in the art. Such bleaching clays have been described in the following references:

A. D. Rich, "Bleaching Clay", Industrial Rocks and Minerals, 3rd Ed., AIME, N.Y. pp 92–101 (1960).

R. L. Grim, "Applied Clay Mineralogy", pp 320–326, (1962).

R. Fahn, "Bleaching Earths—Preparation, Properties, Practical Applications", Chapter 1, International Symposium, Brussels, April 28–29 (1976).

L. L. Richardson, "Use of Bleaching Clays in Processing Edible Oils", JAOCS, 55, 777 (1978).

D. R. Erickson, et. al., editors, "Handbook of Soy Oil Processing and Utilization", John Wiley & Sons, Inc., New York, pp 110–116 (1980).

G. M. Clarke, "Special Clays", Ind. Minerals, Sept. 25 (1985).

A. C. D. Newman, "Chemistry of Clays and Clay Minerals", pp 107–114 (1987).

D. R. Taylor & D. B. Jenkins, "Acid Activated Clays", Soc. Mining Eng. of AIME Transactions, 282, 1901 (1988).

H. B. W. Patterson, "Bleaching and Purifying Fats and Oils—Theory and Practice", pp 77–81 (1992).

The following patents relate to the production of acid-activated bleaching earths:

U.S. Pat. No. 1,397,113 (1921); Prutzman

U.S. Pat. No. 1,579,326 (1924); Kauffman

U.S. Pat. No. 1,642,871 (1927); Chappell, et. al.

U.S. Pat. No. 2,470,872 (1949); Secor

U.S. Pat. No. 2,472,489 (1949); Pierce

U.S. Pat. No. 2,484,828 (1949); Hickey

U.S. Pat. No. 2,553,239 (1949); Christianson

U.S. Pat. No. 2,563,977 (1949); Van Horn, Kahn

U.S. Pat. No. 2,574,895 (1951); Stacker

U.S. Pat. No. 2,671,058 (1952); Mickelson

U.S. Pat. No. 2,872,419 (1959); Farnand

U.S. Pat. No. 2,892,800 (1959); Taipale

U.S. Pat. No. 2,981,697 (1961); Mickelson, et. al.

U.S. Pat. No. 3,617,215 (1971); Massaire, et. al.

U.S. Pat. No. 5,008,226 (1991); Taylor, et. al.

U.S. Pat. No. 5,008,227 (1991); Taylor, et. al.

The foregoing references are incorporated by reference herein for their teachings of bleaching clays which are within the scope of this invention and processes for their preparation.

In a preferred embodiment, bleaching clay for this invention is an acid-activated clay. Acid-activation using sulfuric or hydrochloric acid is typically the preferred methods of acid activation. The preferred clays for use in accordance with this invention are acid-activated montmorillonites (also referred to as smectites and bentonites) and natural bleaching earth attapulgites. For purposes herein, the term "attapulgite" is used to mean chain lattice type clay minerals, encompassing minerals and mineral groups variously referred to in the literature as "attapulgite," "palygorskite," "sepiolite," and "hormite."

As used herein, the "at least one minus 10 micron bleaching clay" refers to bleaching clays having a particle size distribution averaging about 10 microns or less in diameter, preferably these bleaching clays have a particle size distribution wherein 95% of the particles are from about 0.2 to about 10 microns. It is generally preferred that the microspheres formed by the agglomeration of the bleaching clay particles have an average particle diameter of at least five times that of the constituent bleaching clay particles. Particles smaller than about 0.2 microns do not typically negatively affect the performance of the resulting microsphere, but particles larger than about 10 microns should be minimized as they may reduce the physical integrity of the microspheres of this invention. The desired particle size distributions of the bleaching clay useful for the purposes of this invention can be obtained by grinding or pulverizing larger particles before or after activation of the clay and/or through screening, air classification, or other separating means for removing particles larger than 10 microns. Preferably, less than 5% of the particles (by weight) will be greater than 10 microns. There are a number of methods and devices for measuring particle sizes in this range. In this case, the particles sizes were determined using a Mastersizer S, a laser interference device made by Malvern Instruments, Inc. Particles are slurried in water and pumped through the detector cell, usually following an ultrasonic agitation to disperse loose agglomerates.

The porous microspheres of this invention will typically contain a minor amount of at least one binder material, preferably a water dispersible binder. As used herein, a "water dispersible binder" shall mean that under typical process conditions, the binder is soluble in water or other liquid medium or is sufficiently dispersed or suspended therein. Binders suitable for use within the context of the present invention include materials such as alginates, dextrin, glucose, gums, starch, waxes, glues; polymer compounds such as poly(vinylacetate) and poly(vinylalcohol); mineral acids such as sulfuric acid and phosphoric acid; phosphates such as ammonium phosphate; silica compounds such as alkaline silicates and silica hydrosol; and colloidal clays. These binder materials are typically present in an amount up to about 10% by weight of the porous microspheres on a moisture-free basis, preferably 1% to about 5% by weight. Typically, the polymer compound, if present as the only binder, is present in an amount up to about 3% by weight of said microsphere on a moisture-free basis; and the colloidal clay, if present as the only binder, is present in an amount up to about 5% by weight of said microsphere on a moisture-free basis (As used herein in this context means the weight achieved after heating to a constant weight at 250 deg F).

The term "colloidal clay" as used herein refers to metalloaluminum silicate which disperses in water into particles having an average particle size less than one-half micron, as determined by centrifugal sedimentation. While not being bound by theory, the purpose of the binder is to bridge the gaps and/or cement contact points between naturally-noncohesive bleaching earth particles, causing them to stick together both in the preparation and during the use of the resultant microspheres. The range of possible binders can be extended beyond those mentioned above by those skilled in the art. The listing above in not meant to limit the invention, but is merely intended to be exemplary. Colloidal clays typically suitable for use in the instant invention are colloidal attapulgite, colloidal sodium bentonite, colloidal montmorillonite and mixtures thereof.

The microspheres of the compositions of the instant invention have an average diameter of at least about 10 microns, preferably about 20 microns to 30 microns. Preferably, 90% of the microspheres have a diameter of 10 microns to 100 microns.

In another preferred embodiment of the instant invention, the microspheres have a pore volume of at least about 0.3 cc/gm in the 600 Å to the 10,000 Å pore diameter range, more preferably about 0.5 cc/gm in the 600 Å to the 10,000 Å pore diameter range, as measured by mercury penetration porosimetry determined using a Quantichrome Autoscan 60 scanning mercury porosimeter.

These porous microspheres can be prepared by a process which comprises preparing a mixture of (i) at least one minus 10 micron bleaching clay, (ii) at least one liquid medium, and (iii) at least one binder material, wherein said mixture is agglomerated under conditions which produce microspheres having an average diameter of greater than about 10 microns. The bleaching clay and the binder are the same as, and used in the same amounts, as described above. The liquid medium is preferably water or mixtures of water and one or more water miscible liquids. Typically, the solids level of a spray-dryer feed will be about 20–40%, whereas a mechanical mix will contain about 50% or more solids. The mixture may be prepared by combining the components in any order, although, preferably, the bleaching clay is added to the binder-containing liquid medium to facilitate uniform mixing of the components.

The agglomeration of the bleaching clay in the presence of a liquid medium such as water and a binder can be carried out by spray drying, flash drying, or other conglomeration techniques such as the use of a high-shear mixer. Spray drying techniques are well-known in the clay industry. As a reference, consult, e.g., "Atomization and Spray Drying," by W. R. Marshall (Chemical Engineering Monograph Series, No. 2, Vol. 50 (1954)), which is hereby incorporated by reference for its teachings in this regard.

A minor amount of a dispersing agent or a flocculating agent may also be incorporated into the mixture to facilitate dispersion/suspension of the particles in the liquid medium. In addition, materials other than bleaching clay may be incorporated into the mixture in order to have an all-in-one microsphere that does more than just bleach. For example, a minor amount of special water-soluble or water-dispersible sorbents (e.g., silicas, aluminas or other clays) to selectively adsorb sulfur, soaps, phosphorous or other deleterious compounds may be incorporated into the mixture and end up in the microspherical product. Another "additive" might be activated carbon, which can have a beneficial effect on the finished "bleached" oil, removing non-polar impurities which are not effectively removed with bleaching clay alone.

In spray drying, the mixture of bleaching clay, binder, liquid (preferably water) and optional additives or ingredients is adjusted, if necessary, by the addition of liquid so that the bleaching clay slurry is pumpable and sprayable. The concentration of bleaching clay may be between 25% and 50% by weight of the slurry if the particles are large, approximately 10 microns, or between 15% and 25% if the particles are extremely small, about 1–2 microns (due to rheological considerations—smaller, interactive particles tend to make a viscous mix, so transport properties depend on the size of the particles as well as their concentration). The pH of the slurry is preferably adjusted to the 2.5–4 region. The mixture or slurry is then sprayed into an atmosphere of hot, inert (to this product) gases. Although not critical to the instant invention, it is well-known in the art that the vegetable oil bleaching (impurity removal) ability of a bleaching earth is also affected by the acidity of the bleaching particles. In this case, this property can be measured and controlled by adjusting the slurry to a pH of 2.5–3.5. The final product then gives about this same pH if slurried up in water. Higher pH will negatively affect the product's bleaching ability, while lower pH will cause unwanted side reactions to occur during bleaching.

Spray dryers of various designs can be used. These dryers may be of the concurrent, countercurrent, or mixed flow type. Nozzles, disks or the like can be used to disperse the slurry into droplets. The temperature of the inlet and outlet air of the spray dryer will depend, of course, on the design of the dryer. The actual internal temperature of the microspheres in the drying chamber should be below 225° F., for example 180° F. to 200° F. At these temperatures, excess free moisture is eliminated from the clay slurry droplets without removing water of hydration (water of crystallization) from the clay. The droplets thus become porous microspheres and are collected downstream of the drying chamber, by the usual methods. Using a concurrent dryer, an air inlet temperature of about 1000° F. to 1200° F. is suggested when the clay slurry is charged at a rate sufficient to produce an air outlet temperature within the range of 250° F. to 300° F.

In another embodiment, the mixture of bleaching clay, liquid (preferably water), binder and optional ingredients can be agglomerated in a mechanical mixer. A preferred type of mixer employs pins or blades mounted radially on a rotating shaft, so that the tip of the pin or blade, traveling at high speed, causes solid particles, binder and water to impinge upon or contact each other in such a way as to form an agglomerate. In time, nominally-spherical particles tend to grow larger and larger. This phenomenon is enhanced by the tips of the blades or pins coming very close to a stationary wall or to a solid object (e.g., another blade or pin) moving at a different relative rate. The vortexes set up by this shearing motion tend to enhance the sphericity of the growing particles.

Other less energy-intensive mechanical contacting processes are known to those skilled in the art, including the use of drum or dish granulators, fluidized or spouted bed granulators, or tumbling, rotary, vibratory or gyratory granulators. For descriptions of these processes, see, for example, Sherrington, P. J., *Granulation,* Heyden & Son, Ltd., (1981), which is incorporated herein by reference for its teaching in this regard. These and similar devices can be used to produce granules, although not all are optimum for making the instant invention.

This invention calls for strong, porous particles in the relatively-small 10–100 micron range. "Strength" can be defined by any number of attrition tests. For example, agitating the product in oil and then measuring particle size or filter rate will give a relative measure of strength. Alternatively, if the product is transported pneumatically in a loop for a period of time, this can separate strong particles from weaker formulations.

Examples of this invention are included hereinbelow. Of course, these examples are not intended as limiting this invention, as modification of the examples by ordinary expedient may be readily apparent to those of ordinary skill in the art. Unless otherwise indicated in the following examples or elsewhere in the specification claims, all parts and percentages are by weight, temperatures are in degrees Fahrenheit and pressures are at or near atmospheric.

In the examples provided below, two common techniques for evaluating the performance of a particular bleaching earth product are described—a laboratory test bleach and a laboratory filtration test. These tests or variations thereof have been developed over the years to simulate the actual corresponding oil treatment practices in commercial use, allowing the laboratory investigator or quality control specialist to evaluate small bleaching earth samples with reasonable expectation that the lab results will correlate with or predict the material's behavior in a commercial-sized operation.

As stated above, a common objective of the commercial purification operation is to employ a bleaching earth to remove color bodies and other impurities from an edible oil, either vegetable-based (e.g., soybean, canola, corn, cottonseed, etc.) or animal-based (e.g., tallow, lard, fish, etc.) or inedible oil such as a petroleum derived oil. Before being subjected to the bleaching step of the overall purification process, the oil has had its original water-soluble impurities either removed or greatly diminished by one or more upstream processes. The feed oil to the bleaching process will still include water-insoluble impurities such as pigments, (e.g., carotenoids and chlorophylls), peroxides, fatty acids and residual traces of soaps and phospholipids. In the discussion below, it will be shown that there will be an enhanced efficiency over "ordinary" bleaching earths for the removal of these water-insoluble impurities using the instant invention. The microsphere compositions of this invention will be shown to be more efficient on a per-gram basis than an ordinary bleaching earth.

Laboratory Bleaching Test: In this test, 150 grams of refined (caustic-treated, water-washed, and dried) soybean oil is mixed with the proper dosage of bleaching earth at room temperature. The vessel containing this slurry mixture is evacuated to 22–28 inches of mercury vacuum, heated with agitation, and held at 220° F. for 20 minutes. This slurry is then cooled and the bleaching earth is separated from the oil by filtration. Effectiveness of color removal from the oil is indicated by the level of red color (corresponding to carotenoids) and green color (as parts per billion chlorophyll) as read on a McCloskey Edible Oil Colorimeter (McCloskey Scientific Ind. Inc., Newfoundland, N.J.), a visible-light-range spectrophotometer. The color remaining after bleaching can then be plotted vs. the bleaching earth dosage in the original slurry (gm of bleaching earth per 100 gm of oil). Lower color at a particular starting bleaching earth dosage indicates a more efficient bleaching earth.

Laboratory Filtration Test: This test consists of mixing 5 grams of bleaching earth with 200 grams of Witco Carnation mineral oil at 77+/−2 deg F, stirring gently for 2–5 minutes, and vacuum filtering. The filter is a 7.5-cm Buchner funnel; the paper is Curtin Matheson Cat. No. 263–756; vacuum is 22–24 inches of mercury. The filtration is timed from the first oil drop through the filter until a dry spot appears on the filter cake.

EXAMPLE 1

Materials A–E in Table 1 below are products of spray drying in a pilot-scale Bowen spray dryer, Model No. 2 (Bowen Engineering Co., North Branch, N.J.). The bleaching clays used in the preparation of all five cases are acid-activated montmorillonite fines, chemically the same material as Engelhard's commercial bleaching earths, materials G, H and I, to which comparisons are made below. These fines are obtained by the following acid-activation process: Raw clay is taken from the ground in Aberdeen, MS, dried to 15% Free Moisture, and acid activated by cooking for 5 hours in a tank holding the following: 200 parts by weight of clay, 100 parts sulfuric acid (93%), and 200 parts water. The resulting slurry is washed to a nominal slurry pH of 3.0+/−0.5 and dried in a flash dryer to a nominal 15% Free Moisture. The dried material is sized to yield products such as G, H and I, while fines from the system, averaging 5–8 microns in diameter, are collected and used to make the spray-dried products A–E and the mechanically-agglomerated product, F. In preparation of materials A–E, spray dryer feed slurries are nominally 20–25% by weight solids. Pumping rates through the 0.067-inch two-phase (air assisted) nozzle are nominally 0.15 gallons per minute. Nominal dryer temperatures are 900 deg F inlet and 235 deg F outlet. Materials A–E are made essentially the same way with one exception. For materials A–D, the bleaching clay fines going into the spray-dryer slurry have an average particle size of 8 microns (as measured on a Malvern Mastersizer S particle size analyzer). For material E, the fines used to make materials A–D are wet-milled in water at 3 gallons per minute using a continuous media mill (Netzsch Model No. LMC-60, with A-100 glass beads) to an average particle size of 3 microns. Binder "percents" are expressed as percent of the weight of the bleaching clay with which they are mixed. Binders used in spray drying these examples are listed below the table. "Pore volume" as reported below is measured in cc/gm in the 600–10,000 Å region.

EXAMPLE 2

Material F is prepared by mixing 1000 grams of the 8-micron bleaching clay fines described in Example 1 with 800 gm of tap water, 43 gm of N-brand sodium silicate (37% solids) and 6 gm $H_2SO_4$ (94%). This mixture is agitated at a high rate of shear in an Eirich R-02 Mixer (Eirich Machines, Ltd.) for 15 minutes. This product is then dried to 15% FM ("percent Free Moisture" as defined as weight loss in an oven at 220° F. for 1 hour). Finally, the dried, agglomerated product is sieved through a 100-mesh Tyler screen in order to remove any grossly-oversized particles formed in the agglomeration process. An example of the pore size distribution of the mechanically-agglomerated (as differentiated from spray-dried) product is illustrated in Figure I. The product of this example has considerable color removal activity and excellent filterability, as seen in Table 2.

TABLE 1

| Binder(*) | Pore volume in the 600–10,000 Å range | Average particle diameter., microns |
|---|---|---|
| Spray-Dried Bleaching Earths | | |
| A % Polyvinyl alcohol (Mowiol 4-80) | 0.74 | 35 |
| B 5% Na bentonite clay (Green Bond) | 0.73 | 44 |
| C 2% Na silicate (N-brand) | 0.73 | 52 |
| D 5% Attapulgite clay (Attagel) | 0.67 | 46 |
| E 2% Na silicate (N-brand) | 0.45 | 54 |
| Physically-agglomerated Bleaching Earth | | |
| F 2% Na silicate (N-brand) | 0.33 | 61 |
| Commercial bleaching earths - same base clay as A-F, without binders | | |
| G Engelhard F-115FF | 0.13 | 43 |
| H Engelhard F-105SF | 0.12 | 42 |
| I Engelhard F-110 | 0.17 | 22 |
| Commercial bleaching earths - different base clays without binders | | |
| J Quimica Sumex Supreme | 0.13 | 24 |
| K Tonsil Supreme | 0.12 | 24 |
| L Oil-Dri Pure-Flo Supreme V22 | 0.19 | 18 |

(*Sources for the binders: A - Hoechst AG; B - American Colloid Corp.; C, E & F - PQ Corp.; D - Engelhard Corp.) (Quimica Sumex and Tonsil are brand names of Sud-Chemie; Pure-Flo is a brand name of the Oil-Dri Corporation; N-brand is a brand name of P.Q. Corporation)

It can be seen in Table 1 that materials A–F have pore volumes in the 600–10,000 Å range above 0.30 cc/gm, while all the commercial samples are considerably below that level. Figure I shows graphically the cumulative pore volumes of three of these materials (B, C and F) compared to two of the commercial examples (K and H).

Table 1 shows the differences in total pore volume for materials A–D made with "unmilled fines" and material E, made with "milled fines." In both cases, the bleaching activity/filtration rate combinations are excellent.

Table 2 below contains a tabular representation of the bleaching efficacy of the materials described in Example 1. This bleaching efficacy is determined by the "Laboratory Bleaching Test" method described above whereby caustic-refined soybean oil with a Lovibond Red color of 17.9 and a chlorophyll content of 551 ppb is contacted with 0.5% dosage of the respective bleaching earths. The colors of the filtered oil, as read by the McCloskey Colorimeter, are listed in Table 2. "Lovibond Red" measures the carotenes present in the bleached and filtered oil, while "ppb chlorophyll" is a reading based on absorption of certain wavelengths of transmitted light corresponding to the concentration of chlorophyll "a."

The last column of Table 2, "Filter time," is determined by the "Laboratory Filtration Test" using mineral oil are described separately above.

TABLE 2

| | Lovibond Red | ppb Chlorophyll | Filter time |
|---|---|---|---|
| Spray-Dried Bleaching earths | | | |
| A | 3.0 | 20 | 112 sec |
| B | 2.2 | 25 | 80 |
| C | 4.1 | 39 | 52 |
| D | 3.2 | 28 | 40 |
| E | 3.3 | 42 | 80 |
| Physically-agglomerated Bleaching Earth | | | |
| F | 4.1 | 54 | 49 |
| Commercial bleaching earths - same base clay as A–F, without binders | | | |
| G | 8.2 | 246 | 73 |
| H | 8.1 | 234 | 65 |
| I | 3.0 | 50 | 235 |
| Commercial bleaching earths - different base clays without binders | | | |
| J | 6.2 | 145 | 95 |
| K | 7.2 | 169 | 99 |
| L | 6.3 | 142 | 133 |

An extremely desirable commercial bleaching earth might have nominally the filter rate of Sample H and the color-removal activity of Sample I. As stated in Example 1, materials A–F have been prepared using the instant invention. The acid-activation process for the bleaching earth constituents of A–F is the same as for G–I (as described herein above).

It can be seen from Table 2 that the filter times of the materials A–F are considerably lower than that of material I, yet the color removal performance is considerably better than that of material H. In fact, A–E all surpass even I for chlorophyll removal.

Relative bleaching activities of several of the various bleaching earths are compared using the Laboratory bleaching test, described earlier. Commercial materials H, J, and K and material B were each tested at four dosages by a) adding the clay to soybean oil at room temperature, b) heating the mixture to 220° F. under vacuum with agitation and holding for 20 minutes, c) cooling and separating the used bleaching earth from the oil by filtration, and d) analyzing the colors on the McCloskey Edible Oil Colorimeter. Figure II is a graphical representation of the effect of clay dosage on the color of the bleached oil. A greater percentage of clay in the bleach process results in a finished oil with less color (as measured by Lovibond Red and ppb chlorophyll). In this comparison, the refined soybean oil before bleaching had a Lovibond Red of 16.8 and a chlorophyll reading of 790 parts per billion. Figure IIa shows that the spray-dried bleaching earth has better red color removal at all dosage levels than the three commercial bleaching earths. Figure IIb shows the same superiority on chlorophyll, although both the red and chlorophyll levels are necessarily compressed at higher dosages (with little color left to remove). The advantages of the instant invention over the commercial products are especially acute at lower dosages, as Figure II clearly shows.

What is claimed is:

1. A process for purifying edible or inedible oils which comprises mixing one or more oils with a composition comprising agglomerated particles of at least one bleaching clay having a particle size distribution wherein at least 95% by weight of the bleaching clay has an average particle size of about 10 microns or less, wherein the agglomerated particles are microspheres having an average diameter of at least about 10 microns; and recovering purified oil.

2. A process according to claim 1 wherein said microspheres contain at least one binder material.

3. A process according to claim 2 wherein said binder is a colloidal clay selected from the group consisting of colloidal bentonite, colloidal attapulgite and mixtures thereof.

4. A process according to claim 3 wherein said colloidal clay is present in an amount up to about five percent by weight of said microsphere on a moisture-free basis.

5. A process according to claim 2 wherein said binder is a polymer compound selected from the group of poly (vinylalcohol), poly(vinylacetate) and mixtures thereof.

6. A process according to claim 5 wherein said polymer compound is present in an amount up to about three percent by weight of said microsphere on a moisture-free basis.

7. A process according to claim 2 wherein said binder is a silica compound selected from the group consisting of alkaline silicates, colloidal silicas and mixtures thereof.

8. A process according to claim 7 wherein said silica compound is present in an amount up to about five percent by weight of said microsphere on a moisture-free basis.

9. A process according to claim 1 wherein said bleaching clay has an average particle size distribution of from about 0.2 up to about 10 microns.

10. A process according to claim 1 wherein said bleaching clay is an acid-activated clay.

11. A process according to claim 10 wherein said acid-activated clay is selected from the group consisting of acid-activated montmorillonite, acid-activated attapulgite, and mixtures thereof.

12. A process according to claim 1 wherein said microspheres have a pore volume of at least about 0.3 cubic centimeters per gram in the 600 Å to 10,000 Å pore diameter range.

13. A process according to claim 1 wherein the particle size distribution of said microspheres is such that at least about eighty percent of the microspheres by weight have diameters ranging from about 10 microns up to 100 microns.

14. A process for purifying edible or inedible oils which comprises mixing one or more oils with a composition comprising microspheres of at least one bleaching clay having a particle size distribution wherein at least 95% by weight of the bleaching clay has an average particle size of about 10 microns or less, wherein the microspheres have an average diameter of at least about 10 microns and a pore volume of at least about 0.3 cm$^3$/g in the 600 to 10,000 pore diameter range; and recovering purified oil.

15. A process according to claim 14 wherein said microspheres contain at least one binder material.

16. A process according to claim 15 wherein said binder is a colloidal clay selected from the group consisting of colloidal bentonite, colloidal attapulgite and mixtures thereof.

17. A process according to claim 16 wherein said colloidal clay is present in an amount up to about five percent by weight of said microsphere on a moisture-free basis.

18. A composition according to claim 15 wherein said binder is a polymer compound selected from the group of poly(vinylalcohol), poly(vinylacetate) and mixtures thereof.

19. A process according to claim 18 wherein said polymer compound is present in an amount up to about three percent by weight of said microsphere on a moisture-free basis.

20. A process according to claim 15 wherein said binder is a silica compound selected from the group consisting of alkaline silicates, colloidal silicas and mixtures thereof.

21. A process according to claim 20 wherein said silica compound is present in an amount up to about five percent by weight of said microsphere on a moisture-free basis.

22. A process according to claim 14 wherein said bleaching clay is an acid-activated clay.

23. A process according to claim 22 wherein said acid-activated clay is selected from the group consisting of acid-activated montmorillonite, acid-activated attapulgite, and mixtures thereof.

24. A process according to claim 14 wherein said microsphere has a pore volume of at least about 0.5 cubic centimeters per gram in the 600 Å to 10,000 Å pore diameter range.

25. A process according to claim 14 wherein the particle size distribution of said microspheres is such that at least about eighty percent of the microspheres by weight have diameters ranging from about 10 microns up to 100 microns.

26. A process for purifying edible or inedible oils which comprises mixing one or more oils with microspheres prepared by agglomerating at least one bleaching clay having a particle size distribution wherein at least 95% by weight of the bleaching clay has an average particle size of about 10 microns or less, at least one liquid medium, and at least one binder material, wherein the mixture is agglomerated under conditions which produce microspheres having an average diameter of greater than about 10 microns; and recovering purified oil.

27. The process according to claim 26 wherein said bleaching clay has an average particle size distribution of from about 0.2 microns up to about 10 microns.

28. The process according to claim 26 wherein said bleaching clay is an acid-activated clay and the liquid medium is water.

29. The process according to claim 28 wherein said acid-activated bleaching clay is selected from the group consisting of acid-activated montmorillonite, acid-activated attapulgite, and mixtures thereof.

30. The process according to claim 26 wherein said binder is a colloidal clay, polymer compound or silica compound selected from the group consisting of colloidal bentonite, colloidal attapulgite, poly(vinylalcohol), poly(vinylacetate), colloidal silica, alkaline silicate and mixtures thereof.

31. The process according to claim 30 wherein said colloidal clay is present in an amount up to about five percent by weight of said microsphere on a moisture-free basis.

32. The process according to claim 30 wherein said polymeric compound is present in an amount up to about three percent by weight of said microsphere on a moisture-free basis.

33. The process according to claim 30 wherein said silica compound is present in an amount up to about five percent by weight of said microsphere on a moisture-free basis.

34. The process according to claim 26 wherein the mixture is agglomerated by spray drying said mixture.

* * * * *